(12) United States Patent
Hagen et al.

(10) Patent No.: US 12,674,531 B2
(45) Date of Patent: Jul. 7, 2026

(54) FLUID CONNECTION ASSEMBLY

(71) Applicant: Oetiker NY, Inc., Lancaster, NY (US)

(72) Inventors: Kristian James Hagen, Gasport, NY
(US); Kari Ann Sausen, Clarence, NY
(US); Ryan Zillig, Williamsville, NY
(US); Steven James Ost, North Chili,
NY (US)

(73) Assignee: Oetiker NY, Inc., Lancaster, NY (US)

( * ) Notice: Subject to any disclaimer, the term of this
patent is extended or adjusted under 35
U.S.C. 154(b) by 0 days.

(21) Appl. No.: 19/007,643

(22) Filed: Jan. 2, 2025

(65) Prior Publication Data

US 2025/0327538 A1 Oct. 23, 2025

Related U.S. Application Data

(60) Provisional application No. 63/635,716, filed on Apr.
18, 2024.

(51) Int. Cl.
*F16L 23/04* (2006.01)
*F16L 17/04* (2006.01)
*F16L 21/06* (2006.01)
*F16L 37/12* (2006.01)

(52) U.S. Cl.
CPC .............. *F16L 23/04* (2013.01); *F16L 17/04*
(2013.01); *F16L 21/06* (2013.01); *F16L*
*37/1225* (2013.01)

(58) Field of Classification Search
CPC ....... F16L 23/04; F16L 21/06; F16L 37/1225;
F16L 17/04
See application file for complete search history.

(56) References Cited

U.S. PATENT DOCUMENTS

| | | | | |
|---|---|---|---|---|
| 4,781,400 A | * | 11/1988 | Cunningham | |
| 5,647,563 A | * | 7/1997 | Gantner ................. | F16L 21/06 |
| 5,647,612 A | * | 7/1997 | Yoshida ................. | F16L 21/06 |
| 6,267,417 B1 | * | 7/2001 | Fan ......................... | F16L 17/04 |
| 9,939,095 B2 | * | 4/2018 | Campbell | |
| 11,092,269 B2 | * | 8/2021 | Kujawski, Jr. .......... | F16L 21/06 |
| 2023/0375115 A1 | * | 11/2023 | Sausen ............... | F16L 37/1225 |
| 2024/0247743 A1 | * | 7/2024 | Sausen ............... | F16L 37/1225 |

FOREIGN PATENT DOCUMENTS

| | | | | |
|---|---|---|---|---|
| DE | 202006018929 U1 | 4/2008 | | |
| EP | 3571433 B1 | 1/2022 | | |
| FR | 2237111 A1 | 2/1975 | | |
| WO | 2022093323 A1 | 5/2022 | | |
| WO | WO-2022256757 A1 | * | 12/2022 | .......... F16L 37/1225 |

* cited by examiner

*Primary Examiner* — William S. Choi
(74) *Attorney, Agent, or Firm* — Harter Secrest & Emery
LLP; Michael Nicholas Vranjes

(57) ABSTRACT

A fluid connection assembly including a connector body, and
a retainer, including a first end removably connectable to the
connector body, a second end, a first radially outward facing
surface extending from the first end to the second end, a first
radially inward facing surface extending from the first end to
the second end, a first flange extending radially inward from
the first end, and a second flange extending radially inward
from the second end, wherein at least one of the first flange
and the second flange includes a plurality of circumferen-
tially separated sections.

19 Claims, 7 Drawing Sheets

FLUID CONNECTION ASSEMBLY

CROSS-REFERENCE TO RELATED APPLICATIONS

This application claims the benefit under 35 U.S.C. § 119 (e) of U.S. Provisional Application No. 63/635,716, filed Apr. 18, 2024, which application is incorporated herein by reference in its entirety.

FIELD

The present disclosure relates to fluid connectors, and more particularly, to a fluid connection assembly including a retainer that decreases the insertion force required for assembly and allows for quick assembly, disassembly, and serviceability of components without the need for tools.

BACKGROUND

Fluid connectors, fluid connections, or fluid connection assemblies are integral components for many applications, and especially for refrigerant or cooling systems. Since a cooling system is made up of various components, for example refrigeration lines, compressors, and heat pumps, fluid must be able to travel not only within each component but also between components. Refrigeration lines may carry a refrigerant, which is a substance or mixture, usually a fluid, used in a heat pump and refrigeration cycle, and can be hazardous. As such, it is essential that fluid connectors for refrigeration lines be properly secured so as not to allow the release of any refrigerant.

Fluid predominantly moves between components via flexible or rigid hoses which connect to each component by fluid connectors. Such fluid connectors typically secure a tube to a fitting via a threaded nut. However, these parts are often expensive to manufacture and may have sealing issues. Additionally, the force required to secure the threaded nut to the fixture is very large with current designs. Furthermore, some connection assembly solutions take a long time to secure and require tools for the assembly process. Other problems with existing fluid connection assembly designs is they can be easily disconnected, which may allow for dangerous refrigerant or other harmful fluids to be released into the environment.

SUMMARY

The present disclosure is directed to one or more exemplary embodiments of a fluid connection assembly.

In an exemplary embodiment, the fluid connection assembly comprises a connector body, and a retainer, including a first end removably connectable to the connector body, a second end, a first radially outward facing surface extending from the first end to the second end, a first radially inward facing surface extending from the first end to the second end, a first flange extending radially inward from the first end, and a second flange extending radially inward from the second end, wherein at least one of the first flange and the second flange comprises a plurality of circumferentially separated sections.

In an exemplary embodiment, the retainer further comprises a first section, and a second section removably connectable to the first section. In an exemplary embodiment, the retainer further comprises a first section, and a second section displaceable with respect to the first section. In an exemplary embodiment, the first section comprises a protrusion extending radially outward from the first radially outward facing surface, the second section comprises a first hole, and the protrusion is operatively arranged to engage the first hole to lock the first section to the second section. In an exemplary embodiment, first section further comprises a second hole arranged immediately adjacent to the protrusion.

In an exemplary embodiment, the first radially outward facing surface comprises a third section, the third section arranged on the first section, the second section comprises a third flange extending radially from the first radially outward facing surface, and in a locked state of the retainer the third flange overlaps the third section. In an exemplary embodiment, in the locked state the third section is arranged parallel to the third flange. In an exemplary embodiment, the retainer comprises a plurality of planar sections connected at obtuse angles.

In an exemplary embodiment, the connector body comprises a third end, a fourth end, a second radially inward facing surface forming a through-bore, and a second radially outward facing surface including a groove, wherein the first flange is arranged to engage the groove to removably connect the retainer to the connector body. In an exemplary embodiment, the fluid connection assembly further comprises a tube including a shoulder, wherein the tube is arranged to be fluidly connected to the connector body via the retainer. In an exemplary embodiment, in a connected state, the shoulder is axially arranged between the second flange and the fourth end.

The present disclosure is directed to one or more exemplary embodiments of a fluid connection assembly.

In an exemplary embodiment, the fluid connection assembly comprises a connector body, including a first end, a second end, a through-bore extending from the first end to the second end, a first radially inward facing surface, and a first radially outward facing surface including a groove, and a retainer, including a third end, a fourth end, a second radially outward facing surface extending from the third end to the fourth end, a second radially inward facing surface extending from the third end to the fourth end, a first flange extending radially inward from the third end and operatively arranged to engage the groove to removably connect the retainer to the connector body, and a second flange extending radially inward from the fourth end, wherein at least one of the first flange and the second flange comprises a plurality of sections separated by circumferential spaces.

In an exemplary embodiment, the retainer further comprises a first section, and a second section radially displaceable with respect to the first section. In an exemplary embodiment, the first section comprises a first protrusion extending radially outward from the second radially outward facing surface and a first hole, the second section comprises a second protrusion extending radially outward from the second radially outward facing surface and a second hole, and the first protrusion and the second protrusion are operatively arranged to engage the second hole and the first hole, respectively, to lock the first section to the second section. In an exemplary embodiment, the first section further comprises a first through-hole arranged immediately adjacent to the first protrusion, and the second section further comprises a second through-hole arranged immediately adjacent the second protrusion. In an exemplary embodiment, the retainer comprises a plurality of planar sections connected at obtuse angles.

The present disclosure is directed to one or more exemplary embodiments of a retainer for a fluid connection assembly.

In an exemplary embodiment, the retainer comprises a first end, a second end, a radially outward facing surface extending from the first end to the second end, a radially inward facing surface extending from the first end to the second end, a first section, a second section displaceable with respect to the first section, a first flange extending radially inward from the first end, the first flange including a first plurality of circumferentially separated sections, and a second flange extending radially inward from the second end, the second flange including a second plurality of circumferentially separated sections.

In an exemplary embodiment, the first section comprises a first projection extending radially outward from the radially outward facing surface and a first hole, the second section comprises a second projection extending radially outward from the radially outward facing surface and a second hole, and the first projection and the second projection are operatively arranged to engage the second hole and the first hole, respectively, to lock the second section to the first section. In an exemplary embodiment, the retainer further comprises a plurality of planar sections forming the radially outward facing surface and the radially inward facing surface. In an exemplary embodiment, the plurality of sections are connected at obtuse angles.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1A:
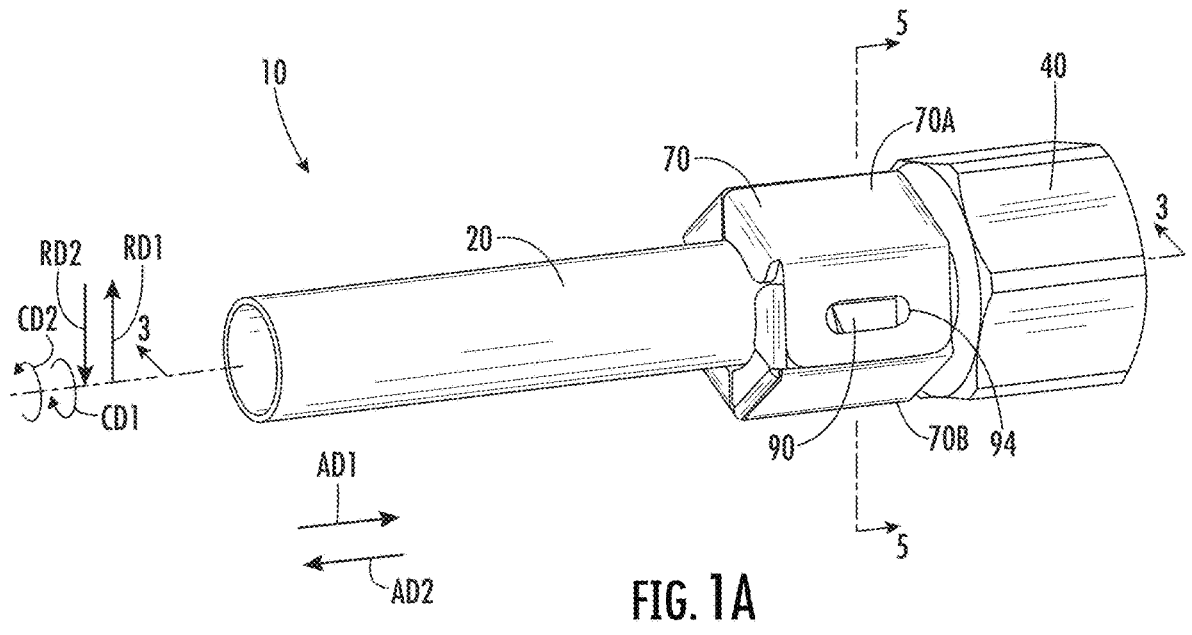
FIG. 1A is a front top perspective view of a fluid connection assembly.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Where used herein, the terms "first," "second," and so on, do not necessarily denote any ordinal, sequential, or priority relation, but are simply used to more clearly distinguish one element or set of elements from another, unless specified otherwise.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "substantially" is intended to mean values within ten percent of the specified value.

Where used herein, the term "exemplary" is intended to mean "an example of," "serving as an example," or "illustrative," and does not denote any preference or requirement with respect to a disclosed aspect or embodiment.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 1B:
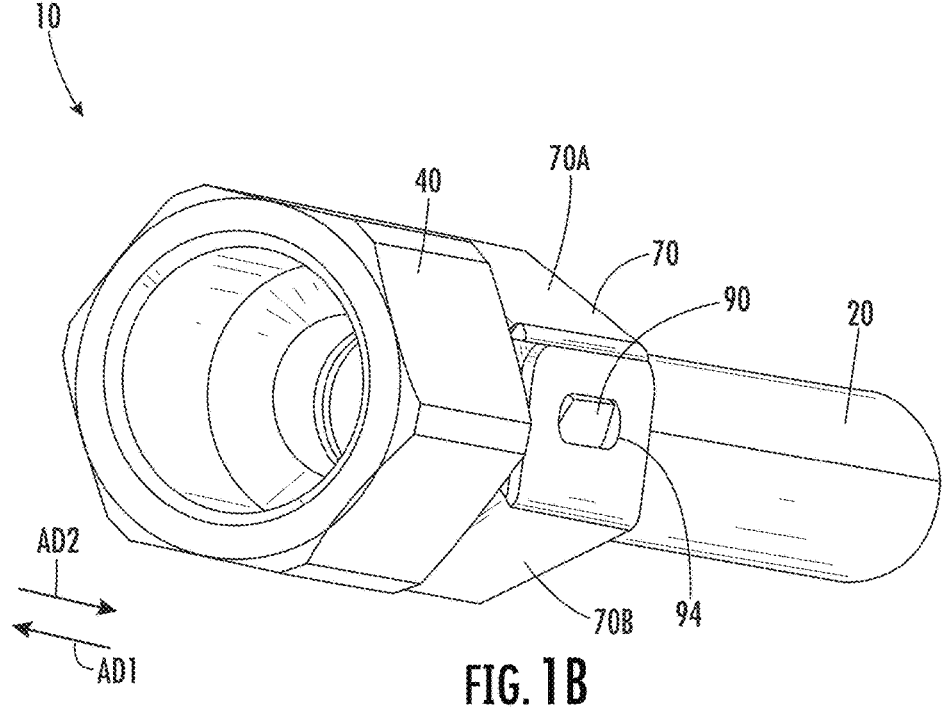
FIG. 1B is a rear bottom perspective view of the fluid connection assembly shown in FIG. 1A.
Figure 2:
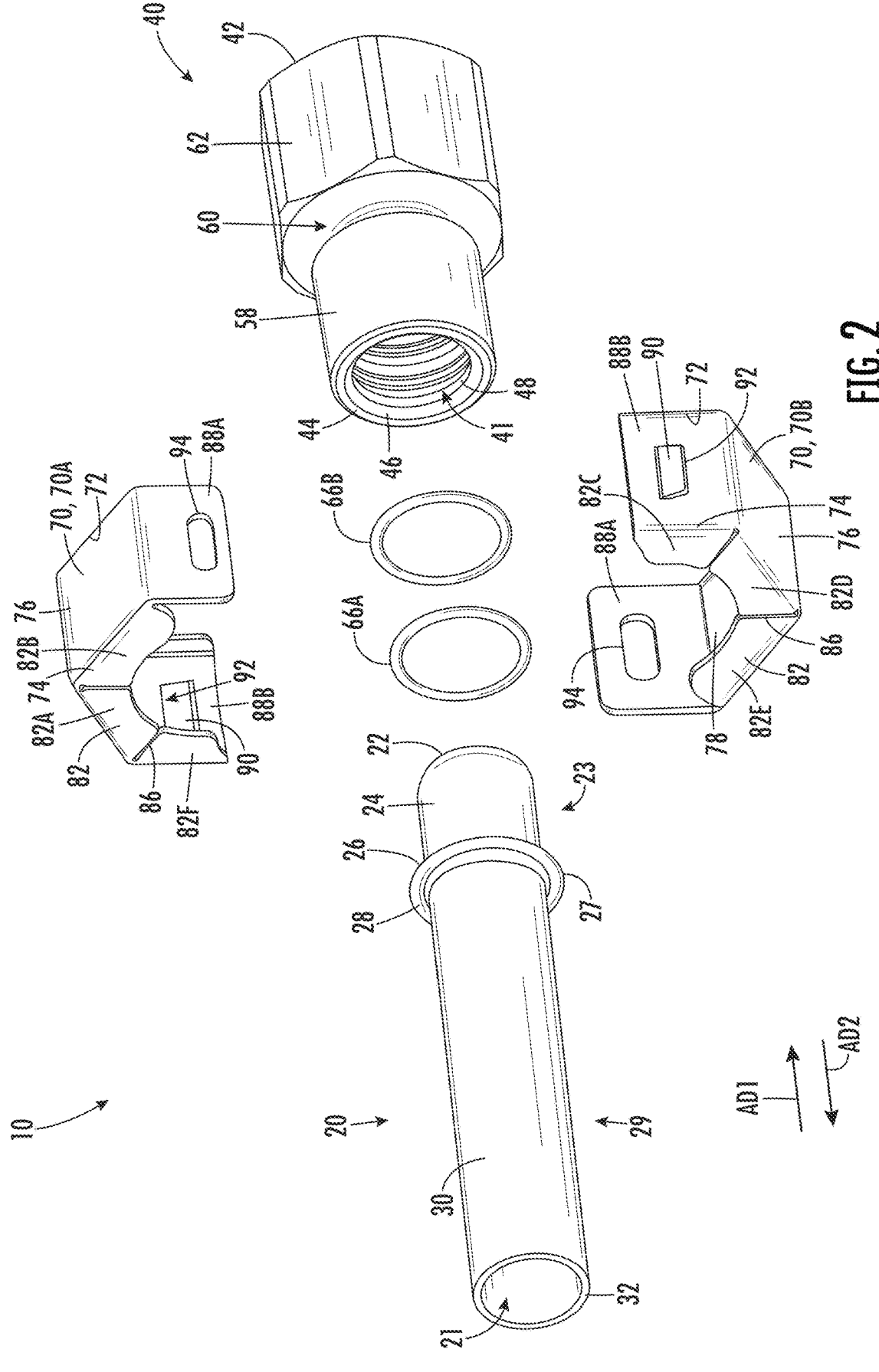
FIG. 2 is a front top perspective exploded view of the fluid connection assembly shown in FIG. 1A.

Adverting now to the figures, FIG. 1A is a front top perspective view of fluid connection assembly 10. FIG. 1B is a rear bottom perspective view of fluid connection assembly 10. FIG. 2 is a front top perspective exploded view of fluid connection assembly 10. Fluid connection assembly 10 comprises retainer 70, 170. In an exemplary embodiment, fluid connection assembly further comprises connector body 40. In an exemplary embodiment, fluid connection assembly 10 further comprises tube 20.

Tube 20 comprises end 22, section 23, bead or shoulder 27, section 29, end 32, and through-bore 21. Through-bore 21 extends through tube 21 from end 22 to end 32. Section 23 is arranged between end 22 and shoulder 27 and comprises radially outward facing surface 24. Radially outward facing surface 24 includes a substantially constant diameter. In an exemplary embodiment, radially outward facing surface 24 comprises a frusto-conical taper or curvilinear surface proximate end 22 (see FIG. 3).

Shoulder 27 is arranged between section 23 and section 29 and comprises surface 26 and surface 28. In an exemplary embodiment, surface 26 is an axial surface facing at least partially in axial direction AD1 and surface 28 is an axial surface facing at least partially in axial direction AD2. In an exemplary embodiment, surface 26 is a frusto-conical surface extending from the radially outward facing surface of shoulder 27 radially inward in axial direction AD1. For example, surface 26 may be a linear conical shape increasing in diameter in axial direction AD2. In an exemplary embodiment, surface 26 may comprise a linear portion and a conical or frusto-conical portion. Shoulder 27 comprises a radially outward facing surface. In an exemplary embodiment, the radially outward facing surface of shoulder 27 comprises a constant diameter. In an exemplary embodiment, the radially outward facing surface of shoulder 27 comprises a variable diameter. Section 29 is arranged between shoulder 27 and end 32 and comprises radially outward facing surface 30. In an exemplary embodiment, radially outward facing surface 30 includes a substantially constant diameter.

Tube 20 is arranged to be inserted, specifically with end 22 first, into connector body 40. Tube 20 is inserted into connector body 40 until section 23, or radially outward facing surface 24, engages radially inward facing surface 48 and shoulder 27 engages end 44. Retainer 70, 170 is then assembled to secure tube 20 to connector body 40. Radially outward facing surface 24 sealingly engages radially inward facing surface 48 via one or more seals, for example seals 66A-66B (see FIG. 3). It should be appreciated that tube 20 may be any traditional tube or tube end form comprising a bead, radially outward extending protrusion or flange, or ramp profile, which extends radially outward and axially on the outer surface of the tube, to secure the tube within the connector body. In an exemplary embodiment, tube 20 comprises at least one of a metal, a polymer, and a ceramic.

Figure 3:
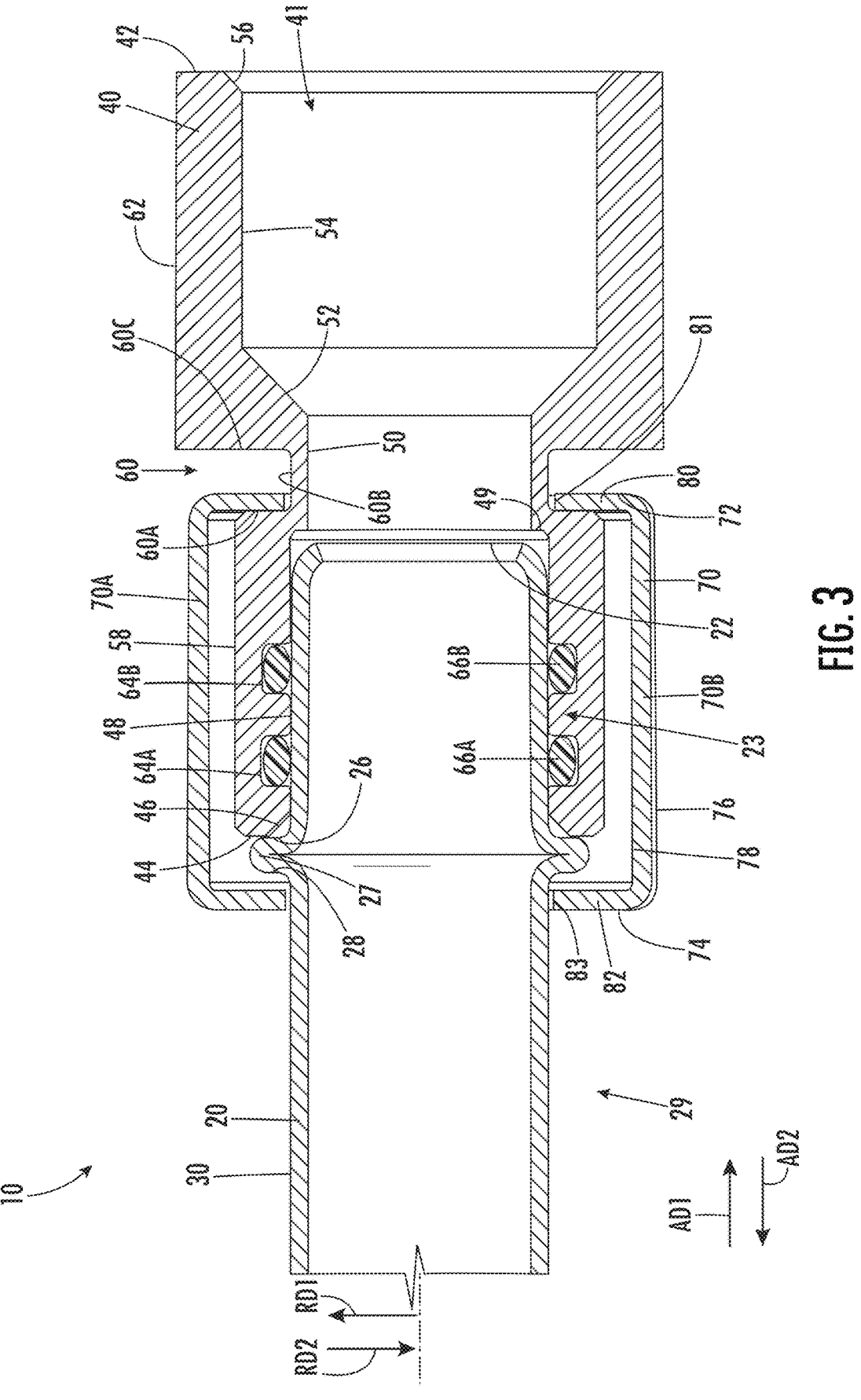
FIG. 3 is a partial cross-sectional view of the fluid connection assembly taken generally along line 3-3 in FIG. 1A.
Figure 4:
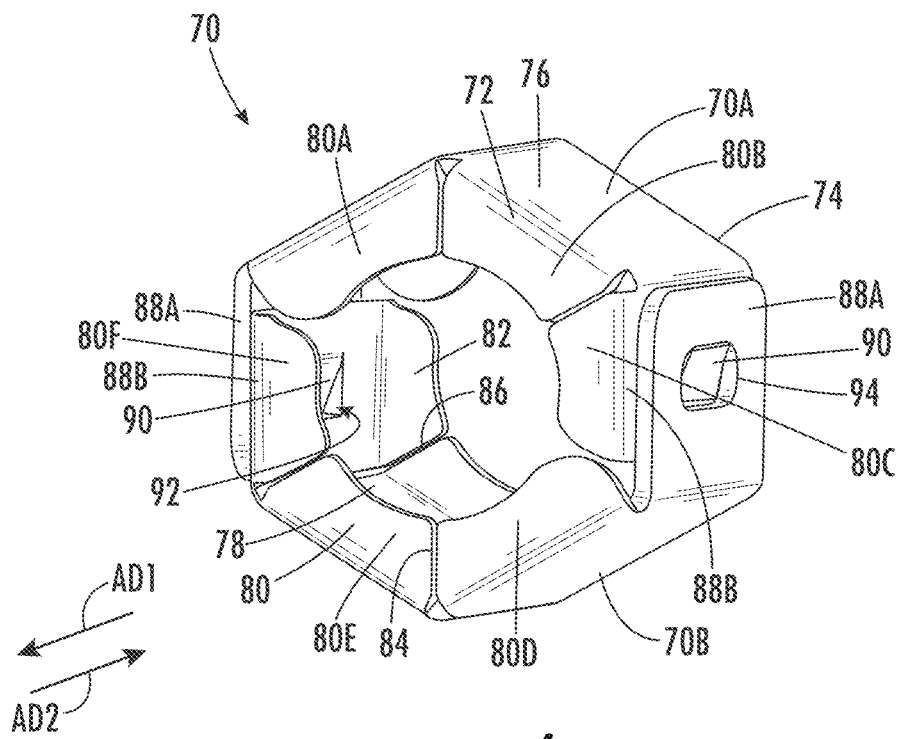
FIG. 4 is a rear top perspective view of the retainer shown in FIG. 1A.
Figure 5:
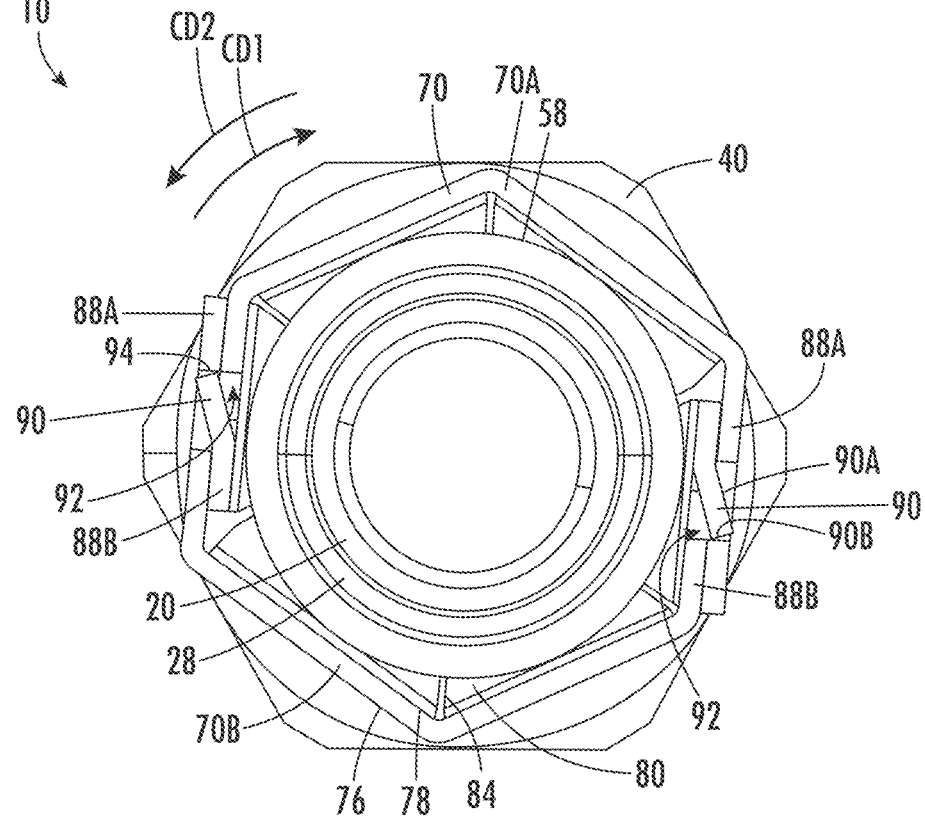
FIG. 5 is a cross-sectional view of the fluid connection assembly taken generally along line 5-5 in FIG. 1A.

FIG. 3 is a partial cross-sectional view of fluid connection assembly 10 taken generally along line 3-3 in FIG. 1A. FIG. 4 is a rear top perspective view of retainer 70. FIG. 5 is a cross-sectional view of fluid connection assembly 10 taken generally along line 5-5 in FIG. 1A.

Connector body 40 comprises through-bore 41 extending from end 42 to end 44, radially inward facing surface 48, at least one groove, for example, grooves 66A-66B, radially inward facing surface 54, radially outward facing surface 58, groove 60, and head 62. In an exemplary embodiment, connector body 40, and specifically end 42, is arranged to be removably and sealingly connected to a component, for example, a service valve body (not shown). Connector body 40 may be screwed onto a service valve body, specifically, by threadably engaging threading on radially inward facing surface 54 with threading of the service valve body. Connector body 40 may be screwed onto the component via head 62 (e.g., using a wrench). In an exemplary embodiment, head 62 is hexagonal; however, it should be appreciated that head 62 may comprise any geometry suitable for applying torque to connector body 40. It should be appreciated that fluid connection assembly 10 may be used in various components, assemblies, and subassemblies in which fluid connection is desired, for example, refrigeration systems or compressors, or a transmission.

Connector body 40 is arranged to be connected to a component that is filled with a fluid or through which fluid flows. For example, connector body 40 may be connected to a refrigerant line (i.e., tube 20). Seals 66A-66B are arranged in connector body 40. Specifically, seals 66A-66B are arranged in grooves 64A-64B to engage tube 20 (i.e., radially outward facing surface 24). Grooves 564A-64B are arranged spaced apart axially in radially inward facing surface 48. In an exemplary embodiment, seals 66A-66B are O-rings. In an exemplary embodiment, connector body 40 only comprises one groove in its radially inward facing surface 48, and one seal arranged therein. In an exemplary embodiment, radially inward facing surface 48 is a substantially cylindrical surface. In an exemplary embodiment, radially inward facing surface 48 is connected to end 44 via surface 46. Surface 46 is a frusto-conical surface increasing in diameter in axial direction AD2. End 44 is operatively arranged to engage shoulder 27, specifically, to prevent axial displacement of tube 20 is axial direction AD1.

In an exemplary embodiment, and as shown, connector body 40 comprises radially inward facing surface 50, which comprises a diameter that is less than the diameter of radially inward facing surface 48. Radially inward facing surface 50 is connected to radially inward facing surface 48 via surface 49. In an exemplary embodiment, surface 49 is a substantially axial facing surface and faces generally in axial direction AD2. In an exemplary embodiment, surface 49 acts as a stop or seat for tube 20 thereby preventing tube 20 from being displaced in axial direction AD1 with respect to connector body 40. In an exemplary embodiment, and as shown, connector body 40 further comprises radially inward facing surface 52 which connects radially inward facing surface 50 with radially inward facing surface 54. Surface 52 acts as a stop or seat for the component to which connector body 40 is connected (e.g., a service valve body). In an exemplary embodiment, radially inward facing surface 52 is a frusto-conical surface that increases in diameter in axial direction AD1 (see FIG. 3). In an exemplary embodiment, radially inward facing surface 54 comprises a diameter that is greater than radially inward facing surface 48. In an exemplary embodiment, radially inward facing surface 54 comprises a diameter that is less than or equal to radially inward facing surface 48. In an exemplary embodiment, radially inward facing surface 54 is connected to end 42 via surface 56. Surface 56 is a frusto-conical surface increasing in diameter in axial direction AD1.

Groove 60 is arranged in radially outward facing surface 58. Groove 54 is arranged axially between end 44 and end 42. Groove 60 comprises axial facing surface 60A, radially outward facing surface 60B, and axial facing surface 60C. Radially outward facing surface 60B of groove 60 comprises a diameter that is less than the diameter of radially outward facing surface 58. In an exemplary embodiment, groove 60 is arranged axially between and spaced apart from end 44 and head 62. In an exemplary embodiment, and as shown, groove 60 is arranged immediately adjacent head 62. Groove 60 is operatively arranged to engage with flange 80, 180 to connect retainer 70, 170 to connector body 40.

In an exemplary embodiment, groove 60 comprises a width that is greater than the width of flange 80, 180. In the partially assembled locked state, when retainer 70, 170 is connected to connector body 40, without tube 20 properly connected or present at all, flange 80, 180 and thus retainer 70, 170 is displaceable in axial direction AD1 and axial direction AD2 with respect to groove 60 and thus connector body 40 (i.e., flange 80, 180 can slide back and forth within groove 60). This provides an indication that fluid connection assembly 10 is not properly assembled. When retainer 70, 170 is connected to connector body 40, with tube 20 properly connected, flange 80, 180 and thus retainer 70, 170 is not displaceable (or is not displaceable as much) in axial direction AD1 and axial direction AD2 with respect to groove 60 and thus connector body 40 (i.e., flange 80, 180 abuts against the axial surface 60A of groove 60 as shown in FIG. 3). In an exemplary embodiment, connector body 40 comprises at least one of a metal, a polymer, and a ceramic.

Retainer 70 comprises end 72, end 74, radially outward facing surface 76, and radially inward facing surface 78. Radially outward facing surface 76 extends from end 72 to end 74. Radially inward facing surface 78 extends between end 72 and end 74. In an exemplary embodiment, retainer 70 forms a polygonal shape, that is, radially outward facing surface 76 and/or radially inward facing surface 78 comprises a plurality of planar sections (e.g., plates) interconnected. The plates may be connected, for example, at obtuse angles with respect to each other (see FIG. 5), and thus, radially inward facing surface 78 comprises a variable diameter. In an exemplary embodiment, radially inward facing surface 78 comprises a constant diameter. Radially inward facing surface 78 is operatively arranged to engage radially outward facing surface 58.

Retainer 70 further comprises at least one flange extending radially inward from radially inward facing surface 78, for example, flange 80 and flange 82. In an exemplary embodiment, flange 80 is arranged at end 72. Flange 80 comprises radially inward facing surface 81. In an exemplary embodiment, surface 81 is curvilinear. Flange 80 is operatively arranged to engage groove 60 to secure retainer 70 to connector body 40. Radially outward facing surface 58 comprises a diameter that is greater than the diameter of radially inward facing surface 81. In an exemplary embodiment, the width of flange 80 is less than the width of groove 60. In an exemplary embodiment, and as best shown in FIG. 4, flange 80 comprises a plurality of sections 80A-80F separated by one or more circumferential slits or spaces 84.

In an exemplary embodiment, flange 82 is arranged at end 74. Flange 82 comprises radially inward facing surface 83. In an exemplary embodiment, surface 83 is curvilinear. Flange 82 is operatively arranged to engage shoulder 27 to secure tube 20 to connector body 40. In an assembled state of fluid connection assembly 10, shoulder 27 is arranged axially between end 44 and flange 82. Shoulder 27 comprises a diameter that is greater than the diameter of radially inward facing surface 48 and radially inward facing surface 83. In an exemplary embodiment, and as best shown in FIG. 2, flange 82 comprises a plurality of sections 82A-82F separated by one or more circumferential slits or spaces 86.

In an exemplary embodiment, retainer 70 comprises section 70A and section 70B. Section 70B is removably connectable to section 70A. In an exemplary embodiment, retainer 70 comprises a locking mechanism operatively arranged to secure section 70B to section 70A to form the locked state of retainer 70. Each of section 70A and section 70B comprises one or more female connector components or holes 94. Hole 94 may be arranged in flange 88A. In an exemplary embodiment, flange 88A generally extends in circumferential direction CD1 with respect to radially outward facing surface 76 such that, in the locked state of retainer 70, flange 88A of section 70B overlaps radially outward facing surface 76 of section 70A, and vice versa (see FIGS. 4-5). In an exemplary embodiment, flange 88A is elastically deformable. Hole 94 is a through-hole that extends through flange 88A. In an exemplary embodiment, hole 294 is axially spaced apart from end 72 and end 74. In an exemplary embodiment, flange 80 and flange 82 do not extend circumferentially on flange 88A (i.e., flange 88A does not have flanges at respective axial ends thereof).

Each of section 270A and section 270B comprises one or more male connector components or protrusions 90. Protrusion 90 extends radially outward from radially outward facing surface 76, and namely, section 88B of radially outward facing surface 76. In an exemplary embodiment, section 88B is arranged parallel to flange 88A. In an exemplary embodiment, section 88B is not arranged parallel to flange 88A. As best shown in FIG. 5, protrusion 90 comprises tapered surface 90A and radial surface 90B. In an exemplary embodiment, radial surfaces 90B are operatively arranged to engage flanges 88A to prevent displacement of section 70A with respect to section 70B. Surface 90A is tapered to facilitate engagement of protrusions 90 with holes 94. Surface 90A extends radially outward in circumferential direction CD1. In an exemplary embodiment, each of section 70A and section 70B comprises hole 92 arranged immediately adjacent to protrusion 90. In such exemplary embodiments, hole 92 may be formed by punching protrusion 90 radially outward in section 88B. To form the locked state of retainer 70, section 70A is displaced toward section 70B. Protrusion 90 engages flange 88A and surface 90A forces flange 88A radially outward until protrusion 90 aligns with hole 92, at which point flange 88A snaps back radially inward thereby securing section 70B to section 70A.

To assemble fluid connection assembly 10, connector body 40 may be connected to an exterior component such as a service valve body. For example, connector body 40 may be screwed onto the component such that threading on radially inward facing surface 54 is engaged with external threading on the component. Tube 20 is inserted in axial direction AD1, with end 22 first, into connector body 40. Radially outward facing surface 24 engages seals 66A-66B and section 23 is arranged inside of connector body 40 proximate radially inward facing surface 48. Shoulder 27 engages end 44 of connector body 40, specifically, surface 26 abuts against end 44. In an exemplary embodiment, and as shown, shoulder 27 resides completely outside of connector body 40. In an exemplary embodiment, end 22 abuts against surface 47. In an exemplary embodiment, end 22 is spaced apart from surface 49. Retainer 70 is secured over both connector body 40 and tube 20. Retainer 70 is arranged over connector body 40 such that section 70A is separated from section 70B, radially inward facing surface 78 is aligned with radially outward facing surface 58, flanges 80 is aligned with groove 60, and flange 82 is aligned with section 29. Section 70A is displaced toward section 70B until protrusions 90 engage holes 94 to form the locked state of retainer 70. Flange 82 prevents displacement of tube 20 in axial direction AD2 and end 44 prevents displacement of tube 20 in axial direction AD1. Additionally, flange 82 engages tube 20, specifically radially outward facing surface 30, thereby preventing the ingress of foreign materials into fluid connection assembly 10.

In the fully assembled locked state, flange 80 engages groove 60 and flange 82 engages shoulder 27 of tube 20. In an exemplary embodiment, in the fully assembled locked state, flange 80 abuts against surface 60A of groove 60, flange 82 abuts against surface 28, and surface 26 abuts against end 44. In an exemplary embodiment, in the fully assembled locked state, flange 80 abuts against radially outward facing surface 60B of groove 60, thus preventing radial or circumferential displacement of retainer 70 with respect to connector body 40. In an exemplary embodiment, flange 82 engages radially outward facing surface 30. The engagement of tube 20 with connector body 40 prevents axial displacement of tube 20 in axial direction AD1 and the engagement of retainer 70 with connector body 40 and tube 20 prevents axial displacement of tube 20 in axial direction AD2, as well as radial directions RD1 and RD2, relative to connector body 40.

To disassemble, protrusions 90 are disengaged from holes 94, for example, by displacing flanges 88A radially outward in radial direction RD1. Sections 70A and 70B are then separated to disengage flange 82 from shoulder 27, at which point tube 20 can be removed from connector body 40.

Figures 6A, 6B:
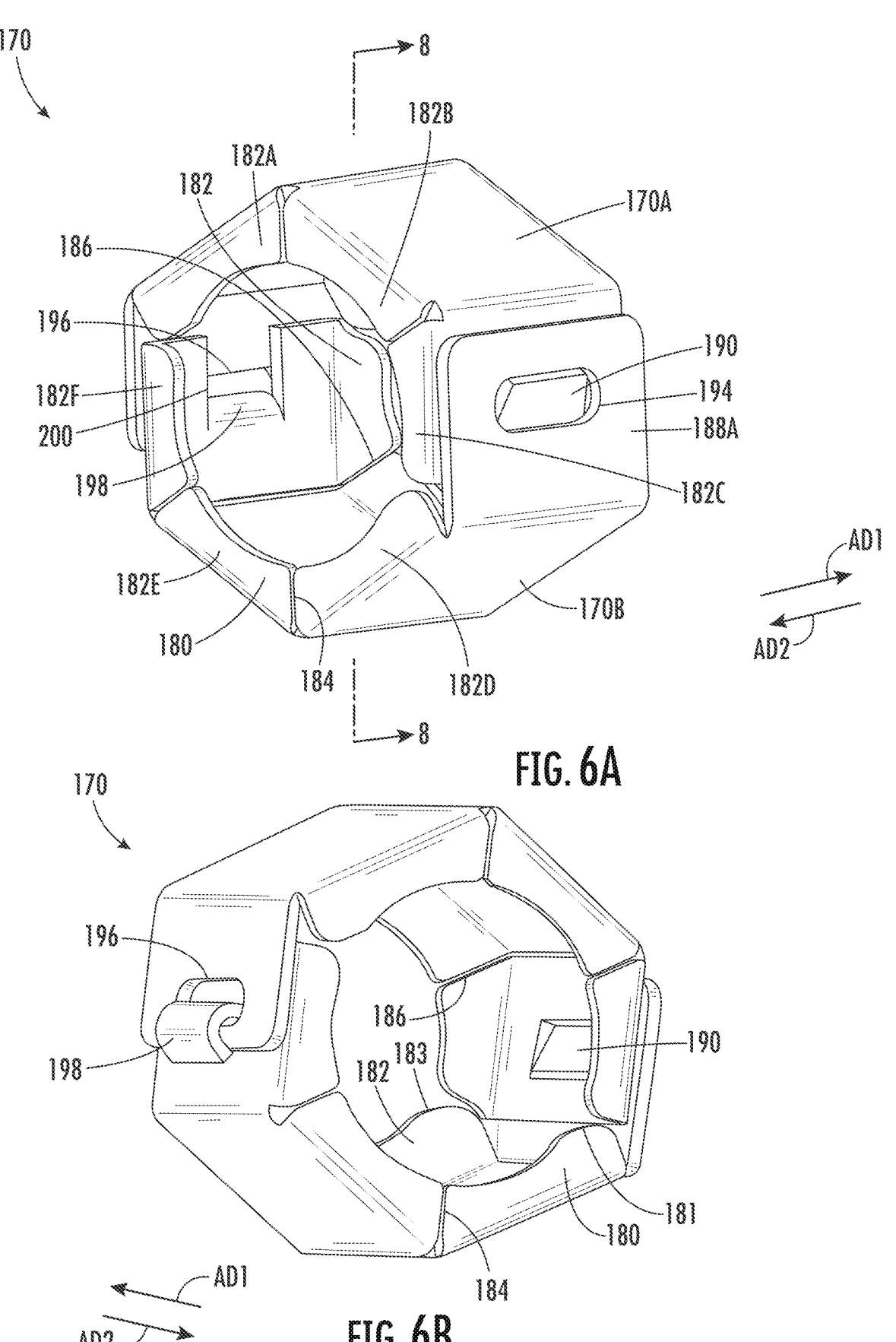
FIG. 6A is a front perspective view of a retainer.
FIG. 6B is a rear perspective view of the retainer shown in FIG. 6A.
Figure 7:
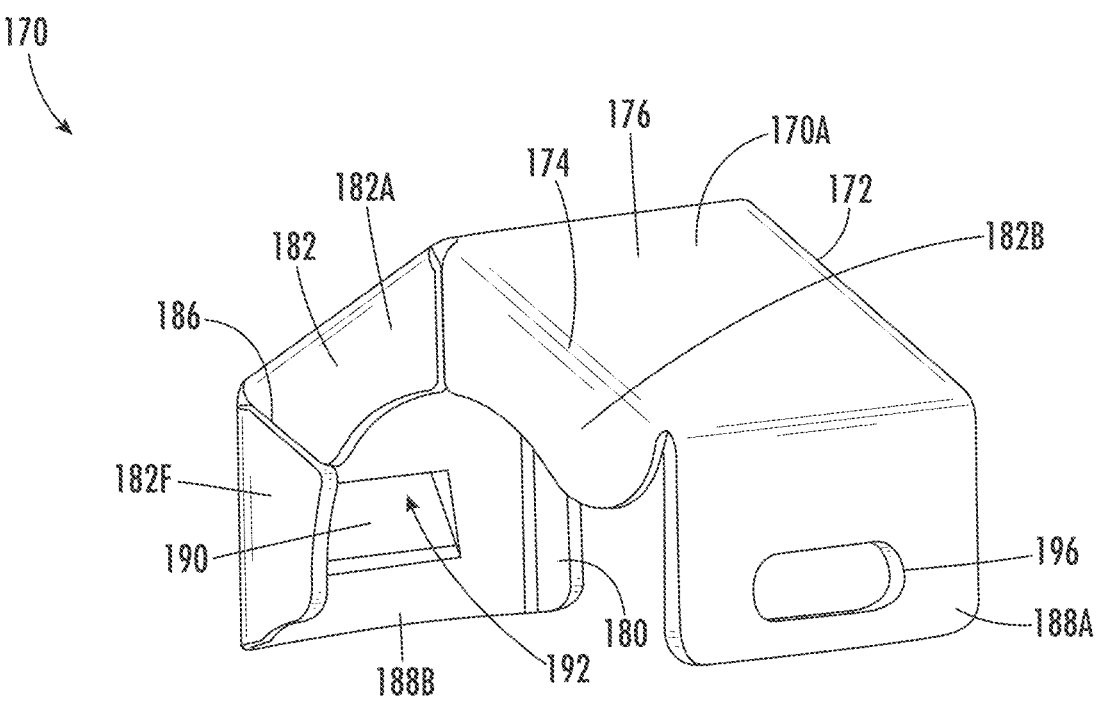
FIG. 7 is a rear perspective exploded view of the retainer shown in FIG. 6A.
Figure 7:
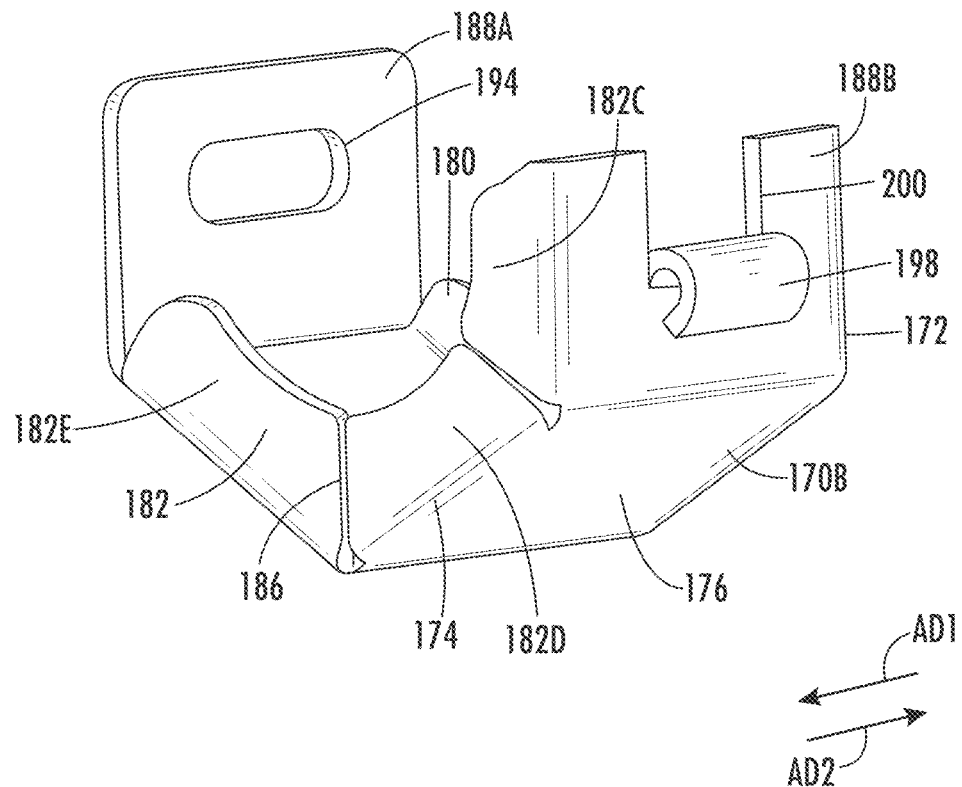
Figure 8:
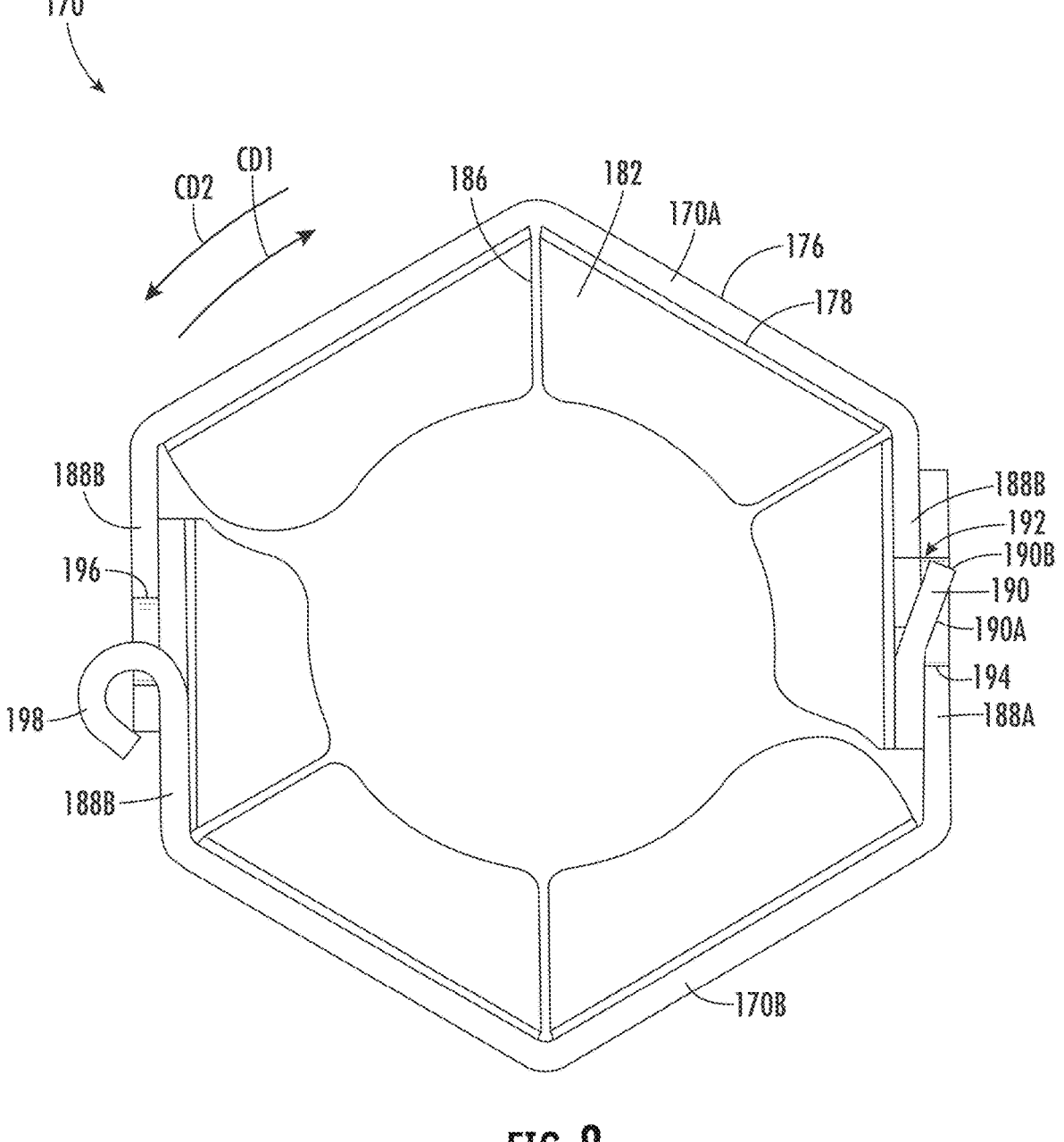
FIG. 8 is a cross-sectional view of the retainer taken generally along line 8-8 in FIG. 6A.

FIG. 6A is a front perspective view of a retainer 170. FIG. 6B is a rear perspective view of retainer 170. FIG. 7 is a rear perspective exploded view of retainer 170. FIG. 8 is a cross-sectional view of retainer 170 taken generally along line 8-8 in FIG. 6A. Retainer 170 may be used in fluid connection assembly 10, for example in place of retainer 70.

Retainer 170 comprises end 172, end 174, radially outward facing surface 176, and radially inward facing surface 178. Radially outward facing surface 176 extends from end 172 to end 174. Radially inward facing surface 178 extends between end 172 and end 174. In an exemplary embodiment, retainer 170 forms a polygonal shape, that is, radially outward facing surface 176 and/or radially inward facing surface 178 comprises a plurality of planar sections (e.g., plates) interconnected. The plates may be connected, for example, at obtuse angles with respect to each other (see FIG. 8). In an exemplary embodiment, radially inward facing surface 178 is operatively arranged to engage radially outward facing surface 58.

Retainer 170 further comprises at least one flange extending radially inward from radially inward facing surface 178, for example, flange 180 and flange 182. In an exemplary embodiment, flange 180 is arranged at end 172. Flange 180 comprises radially inward facing surface 181. In an exemplary embodiment, surface 181 is curvilinear. Flange 180 is operatively arranged to engage shoulder 27 to secure tube 20 to connector body 40. In an exemplary embodiment, and as best shown in FIG. 6A, flange 180 comprises a plurality of sections 180A-180F separated by one or more circumferential slits or spaces 184. In an assembled state of fluid connection assembly 10, flange 180 engages groove 60 in connector body 40. Radially inward facing surface 181 comprises a diameter that is less than the diameter of radially outward facing surface 58. In an exemplary embodiment, the width of flange 180 is less than the width of groove 60, namely, the width of radially outward facing surface 60B.

In an exemplary embodiment, flange 182 is arranged at end 174. Flange 182 comprises radially inward facing surface 183. In an exemplary embodiment, surface 183 is curvilinear. Flange 182 is operatively arranged to engage shoulder 27 to secure tube 20 to connector body 40. In an exemplary embodiment, and as best shown in FIG. 7, flange 182 comprises a plurality of sections 182A-182F separated by one or more circumferential slits or spaces 186. In an assembled state of fluid connection assembly 10, shoulder 27 is arranged axially between end 42 and flange 182. Shoulder 27 comprises a diameter that is greater than the diameter of radially inward facing surface 48 and radially inward facing surface 183.

In an exemplary embodiment, retainer 170 comprises section 170A and section 170B. Section 170B is removably connectable to section 170A. In an exemplary embodiment, retainer 170 comprises a hinged connection mechanism operatively arranged to hingedly connect section 170B to section 170A. One of section 170A and section 170B comprises a male connector component and the other of section 170A and section 170B comprises a female connector component. For example, section 170B comprises male connector component or hook 198. Male connector component 198 extends radially outward from radially outward facing surface 176 and generally extends in circumferential direction CD2 (see FIG. 8). In an exemplary embodiment, section 170B comprises hole 200 immediately adjacent to male connector component 198. In such exemplary embodiments, hole 200 may be formed by punching male connector component 198 radially outward in section 188B. Section 170A comprises female connector component or hole 196 arranged in flange 188A. Male connector component 198 is operatively arranged to engage female connector component 196 to hingedly connect section 170A to section 170B. In an exemplary embodiment, and as best shown in FIG. 8, hook 198 wraps at least partially around a distal end of flange 188A.

In an exemplary embodiment, retainer 170 comprises a locking mechanism operatively arranged to secure section 170B to section 170A to form the locked state of retainer 170. One of section 170A and section 170B comprises a male connector component and the other of section 170A and section 170B comprises a female connector component. For example, section 170B comprises one or more female connector components or holes 194. Hole 194 may be arranged in flange 188A. In an exemplary embodiment, flange 188A generally extends in circumferential direction CD2 with respect to radially outward facing surface 176 such that, in the locked state of retainer 170, flange 188A of section 170B overlaps radially outward facing surface 176 of section 170A, and vice versa (see FIGS. 11A-11B and 13). In an exemplary embodiment, flange 188A is elastically deformable. Hole 194 is a through-hole that extends through flange 188A. In an exemplary embodiment, hole 194 is axially spaced apart from end 172 and end 174. In an exemplary embodiment, flange 180 and flange 182 do not extend circumferentially on flange 188A (i.e., flange 188A does not have flanges at respective axial ends thereof). Section 170A comprises one or more male connector components or protrusions 190.

Protrusion 190 extends radially outward from radially outward facing surface 176, and namely, section 188B of radially outward facing surface 176. In an exemplary embodiment, section 188B is arranged parallel to flange 188A. In an exemplary embodiment, section 188B is not arranged parallel to flange 188A. As best shown in FIG. 8, protrusion 190 comprises tapered surface 190A and radial surface 190B. In an exemplary embodiment, radial surface 190B is operatively arranged to engage flange 188A to prevent displacement of section 170A with respect to section 170B. Surface 190B is tapered to facilitate engagement of protrusion 190 with hole 194. Surface 190B extends radially outward in circumferential direction CD2. In an exemplary embodiment, hole 192 is arranged immediately adjacent to protrusion 190. In such exemplary embodiments, hole 192 may be formed by punching protrusion 190 radially outward in section 188B. To form the locked state of retainer 170, section 170A is displaced toward section 170B. Protrusion 190 engages flange 188A and surface 190A forces flange 188A radially outward until protrusion 190 aligns with hole 194, at which point flange 188A snaps back radially inward thereby securing section 170B to section 170A.

To assemble fluid connection assembly 10, retainer 170 is arranged over connector body 40 such that section 170A is separated from section 170B, radially inward facing surface 178 is aligned with radially outward facing surface 58, flange 180 is aligned with groove 60, and flange 182 is aligned with section 29. Section 170A is displaced toward section 170B until protrusion 190 engages hole 194 to form the locked state of retainer 170. Flange 182 prevents displacement of tube 20 in axial direction AD2 and end 42 prevents displacement of tube 20 in axial direction AD1. In an exemplary embodiment, in an assembled state of fluid connection assembly 10, tube 20, connector body 40, and retainer 170 are concentrically aligned.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

| REFERENCE NUMERALS | |
| --- | --- |
| 10 | Fluid connection assembly |
| 20 | Tube |
| 21 | Through-bore |
| 22 | End |
| 23 | Section |
| 24 | Radially outward facing surface |
| 26 | Surface |
| 27 | Shoulder or bead |

-continued

| REFERENCE NUMERALS | |
| --- | --- |
| 28 | Surface |
| 29 | Section |
| 30 | Radially outward facing surface |
| 32 | End |
| 40 | Connector body |
| 41 | Through-bore |
| 42 | End |
| 44 | End |
| 46 | Surface |
| 48 | Radially inward facing surface |
| 49 | Surface |
| 50 | Radially inward facing surface |
| 52 | Radially inward facing surface |
| 54 | Radially inward facing surface |
| 56 | Surface |
| 58 | Radially outward facing surface |
| 60 | Groove |
| 60A | Surface |
| 60B | Radially outward facing surface |
| 60C | Surface |
| 62 | Head |
| 64A | Groove |
| 64B | Groove |
| 66A | Seal |
| 66B | Seal |
| 70 | Retainer |
| 70A | Section |
| 70B | Section |
| 72 | End |
| 74 | End |
| 76 | Radially outward facing surface |
| 78 | Radially inward facing surface |
| 80 | Flange |
| 80A | Section |
| 80B | Section |
| 80C | Section |
| 80D | Section |
| 80E | Section |
| 80F | Section |
| 81 | Surface |
| 82 | Flange |
| 82A | Section |
| 82B | Section |
| 82C | Section |
| 82D | Section |
| 82E | Section |
| 82F | Section |
| 83 | Surface |
| 84 | Slit(s) |
| 86 | Slit(s) |
| 88A | Radial flange |
| 88B | Section |
| 90 | Male connector or protrusion |
| 90A | Surface |
| 90B | Surface |
| 92 | Hole |
| 94 | Female connector |
| 170 | Retainer |
| 170A | Section |
| 170B | Section |
| 172 | End |
| 174 | End |
| 176 | Radially outward |
| 178 | Radially inward |
| 180 | Flange |
| 180A | Section |
| 180B | Section |
| 180C | Section |
| 180D | Section |
| 180E | Section |
| 180F | Section |
| 181 | Surface |
| 182 | Flange |
| 182A | Section |
| 182B | Section |
| 182C | Section |
| 182D | Section |

-continued

REFERENCE NUMERALS

| | |
|---|---|
| 182E | Section |
| 182F | Section |
| 183 | Surface |
| 184 | Slit(s) |
| 186 | Slit(s) |
| 188A | Radial flange |
| 188B | Radial flange |
| 190 | Male connector or protrusion |
| 192 | Hole |
| 194 | Female connector or hole |
| 196 | Female hinge component or hole |
| 198 | Male hinge component or hook |
| 200 | Hole |
| AD1 | Axial direction |
| AD2 | Axial direction |
| CD1 | Circumferential direction |
| CD2 | Circumferential direction |
| RD1 | Radial direction |
| RD2 | Radial direction |

What is claimed is:

1. A fluid connection assembly, comprising:

a connector body; and a retainer, including:

a first end removably connectable to the connector body;

a second end;

a first radially outward facing surface extending from the first end to the second end;

a first radially inward facing surface extending from the first end to the second end;

a first section including a first projection extending radially outward from the first radially outward facing surface and a first hole extending radially outward from the first radially inward facing surface;

a second section displaceable with respect to the first section, the second section including a second projection extending radially outward from the first radially outward facing surface and a second hole extending radially outward from the first radially inward facing surface;

a first flange extending radially inward from the first end; and a second flange extending radially inward from the second end;

wherein:

at least one of the first flange and the second flange comprises a plurality of circumferentially separated sections; and the first projection and the second projection are operatively arranged to engage the second hole and the first hole, respectively, to lock the second section to the first section.

2. The fluid connection assembly as recited in claim 1, wherein the second section is removably connectable to the first section.

3. The fluid connection assembly as recited in claim 1, wherein the first section further comprises a third hole arranged immediately adjacent to the first projection.

4. The fluid connection assembly as recited in claim 1, wherein:

the first radially outward facing surface comprises a third section, the third section arranged on the first section;

the second section comprises a third flange extending radially from the first radially outward facing surface; and in a locked state of the retainer the third flange overlaps the third section.

5. The fluid connection assembly as recited in claim 4, wherein in the locked state the third section is arranged parallel to the third flange.

6. The fluid connection assembly as recited in claim 1, wherein the retainer comprises a plurality of planar sections connected at obtuse angles.

7. The fluid connection assembly as recited in claim 1, wherein the connector body comprises:

a third end;

a fourth end;

a second radially inward facing surface forming a through-bore; and a second radially outward facing surface including a groove, wherein the first flange is arranged to engage the groove to removably connect the retainer to the connector body.

8. The fluid connection assembly as recited in claim 7, further comprising a tube including a shoulder, wherein the tube is arranged to be fluidly connected to the connector body via the retainer.

9. The fluid connection assembly as recited in claim 8, wherein in a connected state, the shoulder is axially arranged between the second flange and the fourth end.

10. The retainer as recited in claim 1, wherein:

the first hole is a first through-hole extending from the radially inward facing surface to the radially outward facing surface; and the second hole is a second through-hole extending from the radially inward facing surface to the radially outward facing surface.

11. The retainer as recited in claim 10, wherein:

the first projection is a hook; and the hook is operatively arranged to engage the second through-hole to pivotably connect the first section with the second section.

12. A fluid connection assembly, comprising:

a connector body, including:

a first end;

a second end;

a through-bore extending from the first end to the second end;

a first radially inward facing surface; and a first radially outward facing surface including a groove; and a retainer, including:

a third end;

a fourth end;

a second radially outward facing surface extending from the third end to the fourth end;

a second radially inward facing surface extending from the third end to the fourth end;

a first section, including:

a first flange extending radially inward from the third end and operatively arranged to engage the groove to removably connect the retainer to the connector body;

a second flange extending radially inward from the fourth end;

a first circumferential end including a first protrusion proximate thereto and extending radially outward from the second radially outward facing surface; and a second circumferential end arranged substantially diametrically opposed to the first circumferential end, the second circumferential end including a first radially extending hole proximate thereto;

wherein at least one of the first flange and the second flange comprises a plurality of sections separated by circumferential spaces, the circumferential spaces extending completely to the radially inward facing surface; and a second section radially displaceable with respect to the first section.

13. The fluid connection assembly as recited in claim 12, wherein:

the second section comprises a second protrusion extending radially outward from the second radially outward facing surface and a second radially extending hole; and the first protrusion and the second protrusion are operatively arranged to engage the second radially extending hole and the first radially extending hole, respectively, to lock the first section to the second section.

14. The fluid connection assembly as recited in claim 13, wherein:

the first section further comprises a first through-hole arranged immediately adjacent to the first protrusion; and the second section further comprises a second through-hole arranged immediately adjacent the second protrusion.

15. The fluid connection assembly as recited in claim 12, wherein the retainer comprises a plurality of planar sections connected at obtuse angles.

16. A retainer for a fluid connection assembly, the retainer comprising:

a first end;

a second end;

a radially outward facing surface extending from the first end to the second end;

a radially inward facing surface extending from the first end to the second end;

a first section including a first projection extending radially outward from the radially outward facing surface and a first hole extending radially outward from the radially inward facing surface;

a second section displaceable with respect to the first section, the second section including a second projection extending radially outward from the radially outward facing surface and a second hole extending radially outward from the radially inward facing surface;

a first flange extending radially inward from the first end, the first flange including a first plurality of circumferentially separated sections; and a second flange extending radially inward from the second end, the second flange including a second plurality of circumferentially separated sections;

wherein the first projection and the second projection are operatively arranged to extend radially outward through the second hole and the first hole, respectively, to lock the second section to the first section.

17. The retainer as recited in claim 16, wherein:

the first hole is a first through-hole extending from the radially inward facing surface to the radially outward facing surface; and the second hole is a second through-hole extending from the radially inward facing surface to the radially outward facing surface.

18. The retainer as recited in claim 16, wherein the retainer further comprises a plurality of planar sections forming the radially outward facing surface and the radially inward facing surface.

19. The retainer as recited in claim 18, wherein the plurality of sections are connected at obtuse angles.

* * * * *